(12) United States Patent  
Glynn et al.

(10) Patent No.: US 9,052,122 B2  
(45) Date of Patent: Jun. 9, 2015

(54) THERMAL ENERGY STORAGE APPARATUS, ARRANGEMENT AND METHOD

(75) Inventors: Patrick Glynn, Kuraby (AU); Neil Parkinson, North Adelaide (AU)

(73) Assignee: Latent Heat Storage Pty Ltd (AU)

( * ) Notice: Subject to any disclaimer, the term of this patent is extended or adjusted under 35 U.S.C. 154(b) by 242 days.

(21) Appl. No.: 13/390,357

(22) PCT Filed: Aug. 13, 2010  
(Under 37 CFR 1.47)

(86) PCT No.: PCT/AU2010/001035  
§ 371 (c)(1),  
(2), (4) Date: May 9, 2012

(87) PCT Pub. No.: WO2011/017767  
PCT Pub. Date: Feb. 17, 2011

(65) Prior Publication Data  
US 2012/0222415 A1    Sep. 6, 2012

(30) Foreign Application Priority Data

Aug. 14, 2009   (AU) ................................ 2009903818

(51) Int. Cl.  
*F01K 1/00*     (2006.01)  
*F24J 2/34*     (2006.01)  
(Continued)

(52) U.S. Cl.  
CPC .. *F24J 2/34* (2013.01); *Y02E 70/30* (2013.01); *F03G 6/068* (2013.01); *F24J 2/07* (2013.01); *F24J 2/08* (2013.01); *F24J 2/12* (2013.01); *F24J 2/18* (2013.01); *F24J 2/5417* (2013.01); *F28D 20/0056* (2013.01); *F28D 20/02* (2013.01); *F28D 2020/0021* (2013.01); *F28F 21/02* (2013.01); *Y02E 10/41* (2013.01); *Y02E 10/42* (2013.01); *Y02E 10/46* (2013.01); *Y02E 60/142* (2013.01); *Y02E 60/145* (2013.01)

(58) Field of Classification Search  
CPC .............. F24J 2/07; F24J 2/34; Y02E 60/147; Y02E 70/30; Y02E 60/145; F28D 20/0054; F28D 20/02  
USPC ................ 60/516, 659, 641.1, 641.8, 641.11, 60/641.15, 641.13; 165/10; 126/618  
See application file for complete search history.

(56) References Cited

U.S. PATENT DOCUMENTS 3,224,187 A * 12/1965 Breihan .......................... 60/526  
4,010,614 A    3/1977 Arthur  
(Continued)

FOREIGN PATENT DOCUMENTS

WO    WO 2009/158177 A1    12/2009

*Primary Examiner* — Christopher Jetton  
*Assistant Examiner* — Wesley Harris  
(74) *Attorney, Agent, or Firm* — Craig A. Fieschko, Esq.; DeWitt Ross & Stevens S.C.

(57) ABSTRACT

A thermal energy storage apparatus adapted to receive heat source input for the development and substantially continuous supply of thermal energy to a Stirling engine for the transfer of said thermal energy to electrical and/or mechanical energy, even during periods when heat source input is intermittent or unavailable for a period of time. The apparatus includes a series of elongate canisters containing silicon metalloid and made of refractory material. The canisters are interlaced with a thermal energy absorbing material in communication with a wicking material to which the Stirling engine is in communication.

14 Claims, 6 Drawing Sheets

(51) Int. Cl.
*F03G 6/06* (2006.01)
*F24J 2/07* (2006.01)
*F24J 2/12* (2006.01)
*F24J 2/18* (2006.01)
*F28D 20/00* (2006.01)
*F28D 20/02* (2006.01)
*F28F 21/02* (2006.01)
*F24J 2/08* (2006.01)
*F24J 2/54* (2006.01)

(56) References Cited

U.S. PATENT DOCUMENTS

| | | | | |
|---|---|---|---|---|
| 4,335,578 | A | * | 6/1982 | Osborn et al. ............... 60/641.8 |
| 4,586,334 | A | | 5/1986 | Nilsson, Sr. et al. |
| 4,642,988 | A | * | 2/1987 | Benson .................. 60/641.14 |
| 4,768,345 | A | | 9/1988 | Kardas |
| 5,000,252 | A | * | 3/1991 | Faghri ............................. 165/10 |
| 5,074,283 | A | * | 12/1991 | Beatty et al. .................. 126/618 |
| 5,634,339 | A | * | 6/1997 | Lewis et al. ..................... 60/650 |
| 7,969,075 | B2 | * | 6/2011 | Weaver et al. .................. 313/46 |

\* cited by examiner

THERMAL ENERGY STORAGE APPARATUS, ARRANGEMENT AND METHOD

TECHNOLOGICAL FIELD

This invention relates to a unique thermal storage apparatus that is adapted to continuously convert thermal energy to electrical and/or mechanical energy.

BACKGROUND ART

It is to be noted that while the following description for the most part uses the example of the supply of energy to the thermal storage apparatus, as being solar based, the scope of the invention should not be considered so limited.

The solution provided for by this invention would equally work as well if other heating or electrical elements are used to supply energy to the thermal storage apparatus, which is then able to convert thermal energy created and stored in the apparatus to electrical and/or mechanical energy as required.

For example wind turbines and so forth could be used just as well as an interrupted solar supply of energy to the thermal storage apparatus that is adapted to continuously convert the thermal energy to electrical and/or mechanical energy.

As most members of the purchasing public are aware, there has been a push in recent years to move away from fossil fuels as a means of deriving various energy sources. The move towards what is generally characterised as cleaner fuel sources has seen significant development in the field of the use of solar as a means of providing usable forms of energy.

Nonetheless, by its very nature, solar's biggest pitfall is the fact that, at certain times of the day the inability for the sun to provide the necessary photons of energy or heat to various apparatus that utilise this source of energy, means that they remain inoperative.

Interrupted or inconsistent supply of energy from a source makes it, in many instances, unreliable and also uneconomical.

Still further, in certain instances, the sun's rays are so excessive that this useful heat and energy, which it is providing to the apparatus that is converting such energy to more workable forms of energy, is simply dissipated as over-supply during such periods.

Therefore, it would be particularly advantageous to be able to bring together an arrangement which could still be involved in utilising the energy derived from the sun through its solar activity, even in times when such solar activity is not available, and still further utilise this, what one could consider, oversupply of solar energy during such periods also.

In Australian Provisional Patent Application No. 2008903800, a thermal energy conversion system was provided that was able to address some of these difficulties.

Through the construction of a thermal energy storage apparatus that included an elemental form of silicon, for the first time it was possible to utilise the unique features of a elemental form of silicon material as a means of storing thermal energy inside the material for use at a later time, for example, when the solar input form the sun was no longer available, such as during the evenings or times of inclement weather.

Basically, as described in Australian Provisional Patent Application No. 2008903800, during peak solar activity the elemental form of silicon material would absorb thermal energy as it transformed its physical state from a solid to a liquid.

Elemental form of silicon material is characterised by the unique property not dissimilar to water and ice, where on solidifying, there is actually an expansion of the material rather than expected contraction thereof.

The initial heat transfer of energy into the elemental form of silicon material from its solidified state to a liquid allows the unique ability of being able to maintain or store thermal energy.

This absorbed thermal energy, which remains stored within the elemental form of silicon material, is then re-introduced back into the apparatus for maintaining the necessary supply of thermal energy, which for the most part, would be converted into either electrical and/or mechanical action through electrical devices such as a Stirling engine and so forth.

Hence, for the first time, this invention described in Provisional Patent Application No. 2008903800, through the use of the elemental form of silicon material, provided a means in which consistent supply of thermal energy could be given to converters of such thermal energy into electrical and/or mechanical energy for their continual operation, despite the fact that the initial source or supply of thermal energy was the result of solar activity.

Nonetheless, the use of elemental form of silicon material is one that requires significant care and understanding of its physical transformation during its expansion and contraction as it absorbs, first of all, thermal energy to move towards a liquid state, store the material, but then at the same time its expansion, as it changes from a liquid state back to the solid.

The expansion and contraction of the elemental form of silicon material creates significant build-up of pressure on the enclosure or confinement in which it is placed inside the energy storage apparatus, which functions as supplying a continual thermal source to electrical devices such as the Stirling engine which utilises the thermo-dynamic principles of the Stirling cycle to convert thermal energy into electrical energy.

The person skilled in the art will immediately appreciate the significant deficiencies in the means in which the elemental form of silicon material is housed inside the thermal energy storage apparatus described in Provisional Patent Application No. 2008903800.

In one embodiment described in the document, it is taught that the elemental form of silicon material would be ingots, which would be introduced into a series of longitudinal cavities that have been shaped into the pressurised moulded block of sintered graphite.

As the person skilled in the art would know such an arrangement would result in the metalloid being absorbed by the graphite when the phase change occurred.

In this embodiment the graphite would also act as an energy absorbing material, which would receive initial thermal energy input from the solar source and then distribute this into the cavities containing the elemental form of silicon ingots.

The elemental form of silicon ingots would then accept this transfer of thermal energy, undergo the change of state, and therefore maintain what could best be described as a storage or latent supply of thermal energy.

While the provisional patent application filed under Patent No. 2008903800 discusses the fact that the cavities contain the elemental form of silicon ingots will allow for thermal expansion, from a practical point of view, the continual pressure build-up and then collapsing of the elemental form of silicon ingots as they move between the respective states of solidifying and liquefying to provide or store the necessary thermal energy transfer, has seen these kinds of cavities and also the supporting moulded sintered graphite about the elemental form of silicon ingots crack and fissure in structure.

Therefore, there clearly remains a need to come up with an improved means in which to house the elemental form of silicon material, so that as it undergoes its various transformation from the respective liquid and solid states, the pressure build-up and so forth does not translate to the cracking and destruction of the overall storage apparatus.

There would also be a need for such a housing of the elemental form of silicon ingots, which would see it more appropriately concentrating, or being able to distribute, the thermal heat to be transferred during the respective state transformation between the elemental form of silicon material and the energy absorbing material that surrounds such elemental form of silicon material within the thermal energy storage apparatus.

A further problem with Provisional Patent Application No. 2008903800 was the fact that the solar reflector arrangement that was responsible for acting as a solar collector so as to provide a concentrated solar energy input into the storage apparatus, has proved to be insufficient in design and performance when tested in simulated conditions.

The current arrangement of the parabolic reflector is such that rather than having a focal point, at best there is a focal region, which sees a dilution or general dissipation of the concentrated solar input to the focal point.

Therefore, there also remains the need, when dealing with energy generation apparatus that includes the use of Stirling engines with solar reflectors, to have a solar collector arrangement able to more appropriately concentrate solar energy onto a focal point.

Accordingly, it is an object of this invention to provide an improved thermal energy storage apparatus arrangement and method over and above those that have hitherto been made available, and in particular the embodiments described and defined in Australian Provisional Patent Application No. 2008903800.

Further objects and advantages of the invention will become apparent with the complete reading of this specification.

SUMMARY OF THE INVENTION

Accordingly there is provided a thermal energy storage apparatus adapted to receive heat source input for the development and substantially continuous supply of thermal energy to a Stirling engine for the transfer of said thermal energy to electrical and/or mechanical energy, even during periods when heat source input is intermittent or unavailable for periods of time, said apparatus including:
- a main housing block supporting internally a series of elongated canisters made of refractory material interlaced with a thermal energy absorbing material;
- said elongated refractory canisters containing elemental form of silicon material adapted to absorb thermal energy from the interlaced and surrounding thermal energy absorbing material contained within the main housing block;
- wherein the absorbing of thermal energy from the surrounding thermal energy absorption material by the elemental form of silicon material sees a physical transformation from a solid to liquid state allowing said elemental form of silicon material to latently or effectively store the thermal energy therein, such that when the surrounding or interlaced thermal energy absorbing material is at a lower temperature gradient than the temperature associated with the elemental form of silicon material, there will be a transfer of heat energy from said elongated canister back into the thermal energy absorbing material;
- said thermal energy absorption material in communication with a wicking material to which the Stirling engine is also in communication, such that thermal energy transfer from the thermal energy absorption material into the wicking material registers as a thermal energy input to the Stirling engine to commence the transfer of said thermal energy to workable mechanical and/or electrical energy through the Stirling engine;
- said elongated canister containing the elemental form of silicon material characterised in having an internally lined casing made of refractory material which combines a cylindrical body to receive the elemental form of silicon material.

An advantage of such an arrangement is that, for the first time, the use of the elemental form of silicon material can be safely controlled and held appropriately inside the thermal energy storage apparatus.

By containing the elemental form of silicon material within the purposely designed and constructed elongated canister, this safeguards the integrity and the internal structure of the main housing block to which the elemental form of silicon material is contained therein.

Advantageously, in this arrangement, by enclosing the elemental form of silicon material inside the canister made of lined refractory material that also includes the pressure disbursement punt, means that during the cooling process when there is significant pressure placed upon the canister, this pressure can be disbursed and controlled through the use of the punt.

With a control of the expansion and contraction of the elemental form of silicon material enclosed inside the elongated canister, means that the pressure associated with its change of state will not be realised or placed upon the surrounding thermal energy absorption material, or in fact the main structure of the housing block per se of the thermal energy storage apparatus.

In preference the elongated canister is cylindrical.

In preference in a further form of the invention in order to be able to control the exchange of thermal energy between the thermal energy absorption material and the elemental form of silicon material, the elongated canister has been constructed so as to include a series of slots or grooves along a portion of its external periphery.

This series of grooves or slits or similar type slots allows for greater surface contact between the canister containing the elemental form of silicon material and the surrounding and interlacing thermal energy absorption material.

For the most part, these slots and grooves can act as some type of heat seek, thereby allowing designable and controllable direction of the concentration of the thermal energy between the respective material.

Effectively, these slots and grooves about the external periphery of the elongated canisters enable a greater surface area contact between the respective materials to which thermal energy exchange is undergoing.

Hence, it is now possible to safely and conveniently provide a thermal energy storage apparatus, even though it utilises particularly difficult to handle material such as elemental form of silicon.

The ability to be able to contain such material in a very unique elongated canister that has purpose inbuilt features to control the pressure build up and so forth during expansion and contraction of the elemental form of silicon material by way of the pressure dispersion punt and also the ability to control, to a certain extent, heat flow through the heat sinking feature of the series of grooves about the periphery of the canister, means that the Stirling engine which requires thermal energy to convert to mechanical and/or electrical energy can be continuously fed with a supply of such thermal energy, even despite the fact that the initial source of thermal energy from an input heat source such as but not limited to solar, which under certain conditions, periodically would be unavailable the supply of energy from the apparatus may still be maintained.

Advantageously, the difficult to handle elemental form of silicon material has now been uniquely confined inside elongated canisters and its control and effect upon the main housing block can be monitored at all times.

Advantageously, as the elemental form of silicon material is housed in individual elongated canisters, they can be removed independently of the other, when and if required.

In preference, the main housing block of the thermal energy storage apparatus is itself substantially cylindrical and supported therein would be a series of circulated individual elongated canisters, wherein preferably there would be two rows of elongated canisters circumferentially enclosed and intertwined within the thermal energy absorbing material.

In preference, the inner peripheral circumferentially positioned row of elongated canisters has a smaller diameter to the second outer circumferentially positioned elongated canisters.

An advantage of such an arrangement is that, again by design, greater emphasis is placed on more control and directiopality in assisting the direction of energy from the elemental form of silicon material out to the thermal energy absorbing material.

In preference, the thermal energy absorbing material is made up of sintered graphite.

In preference, this sintered graphite material is compressed or moulded into elongated rods which are entwined and packed against the respective elongated canisters, which contained the elemental form of silicon material.

An advantage of such an arrangement is that, rather than having a single block of moulded sintered graphite, the ability to actually have these individual sintered graphite rods and also individual elongated canisters containing the elemental form of silicon material, these respective materials can be conveniently packed around one another according to any dimensions and so forth required inside the thermal energy storage apparatus.

Still further, if there is damage or replacement is required, the entire single block of moulded sintered graphite would no longer need replacing.

These individual moulded or compressed sintered graphite rods can be made to order and simply replaced, if and when damaged, inside the thermal energy storage apparatus takes place.

In preference the input source input is solar.

In a further form of the invention, although it need not be the only nor indeed the broadest form of the invention, there is the use of a solar reflector, including a thermal energy conversion system, to provide the focussing of the collectable solar energy more directly upon the thermal energy storage apparatus:

In order to maximise the collection of solar energy, the housing block would be located at a focal point of the solar collector so as to receive concentrated solar energy.

However, unlike previously available solar collectors, the one provided for in this invention includes, not only a parabolic reflector which includes supports and is movable in both azimuthally and elevation directions, it will also include the use of two further lenses and/or reflector plates so as to direct and concentrate the solar energy being derived from the solar activity.

Advantageously, there will therefore be greater control in establishing the focal point, which will assist in the positioning of the thermal energy storage apparatus within the solar reflector unit.

Preferably, the main parabolic reflector will also, be divided into segmental portions that include slight gaps in between as the reflector dish is configured to allow wind to pass there through, rather than placing unnecessary pressure and deflection against the main parabolic reflector, which people skilled in the art would realise can be many meters in dimension.

In preference the cylindrical body and its supporting base includes a punt to act as a pressure dispersion location during the relative expansion and contraction of the elemental form of silicon material during the absorption and/or release of thermal energy as the material undergoes a physical change in state.

In order now to describe the invention in greater detail, a preferred embodiment will be presented with the assistance of the following illustrations and accompanying text.

Nonetheless, this preferred embodiment should not be considered as outlining the general scope of the invention, which has been told more appropriately in its broader sense precedingly herewith.

As introduce above it is to be noted that while the following description for the most part uses the example of the supply of energy to the thermal storage apparatus, as being solar based, the scope of the invention should not be considered so limited.

The solution provided for by this invention again as discussed above would equally work as well if other heating or electrical elements are used to supply the heat source input to the thermal storage apparatus, which is then able to convert thermal energy created and stored in the apparatus to electrical and/or mechanical energy as required.

As discussed above these things could include further examples like wind turbines and so forth could be used just as well as an interrupted solar supply of energy to the thermal storage apparatus that is adapted to continuously convert the thermal energy to electrical and/or mechanical energy.

DETAILED DESCRIPTION OF THE DRAWINGS

Referring to drawings now in greater detail, where there is provided a thermal energy storage apparatus, shown generally as (10).

Figure 1:
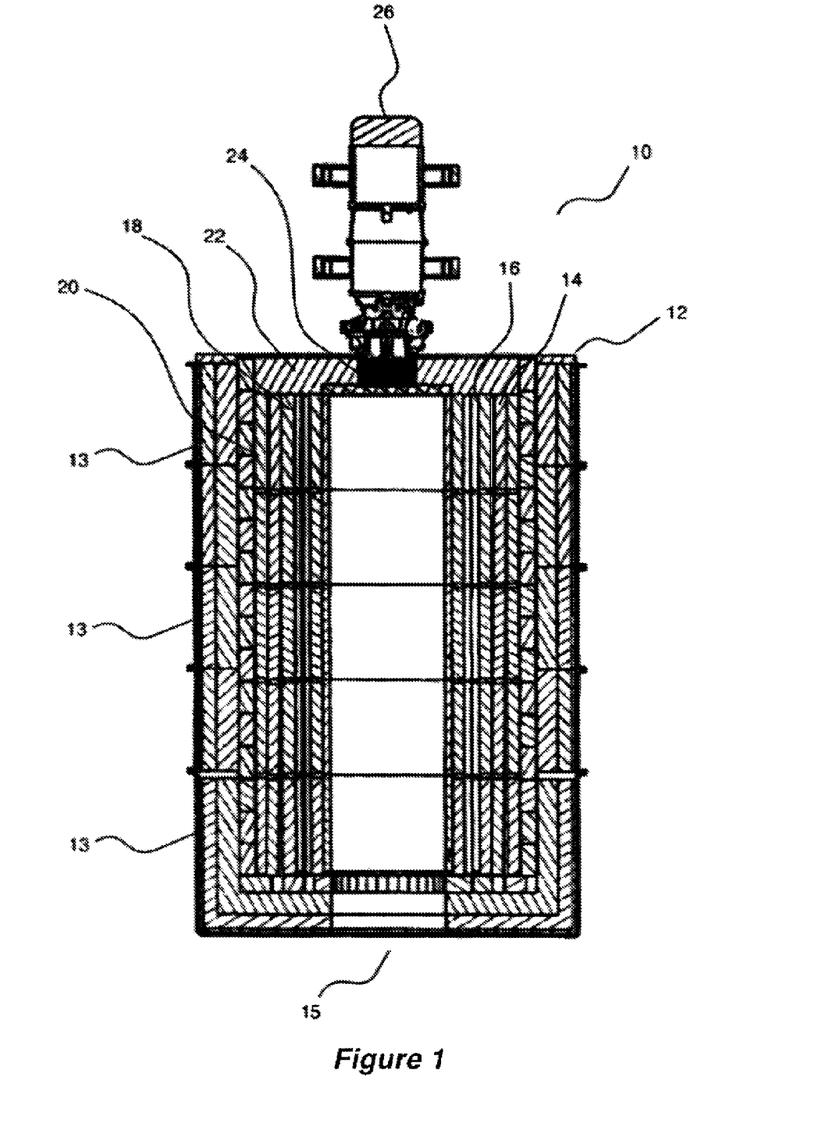
FIG. 1 is a cross-sectional view of the thermal energy storage apparatus in a preferred embodiment of this invention.

This thermal energy storage apparatus (10) includes a main housing block, shown generally as (12), which may or may not be sectionally constructed as shown by the general numbering (13) on FIG. 1.

Supported therein are elongated canisters containing elemental form of silicon material, shown generally as (14) and (16).

Interlaced or packed there about the elongated canisters is the thermal energy absorbing material of sintered graphite, shown generally as (18) and (20), which is in communication with a wicking thermal energy absorbing material (22), which is in contact with location (24) of the Stirling engine (26).

Figure 2:
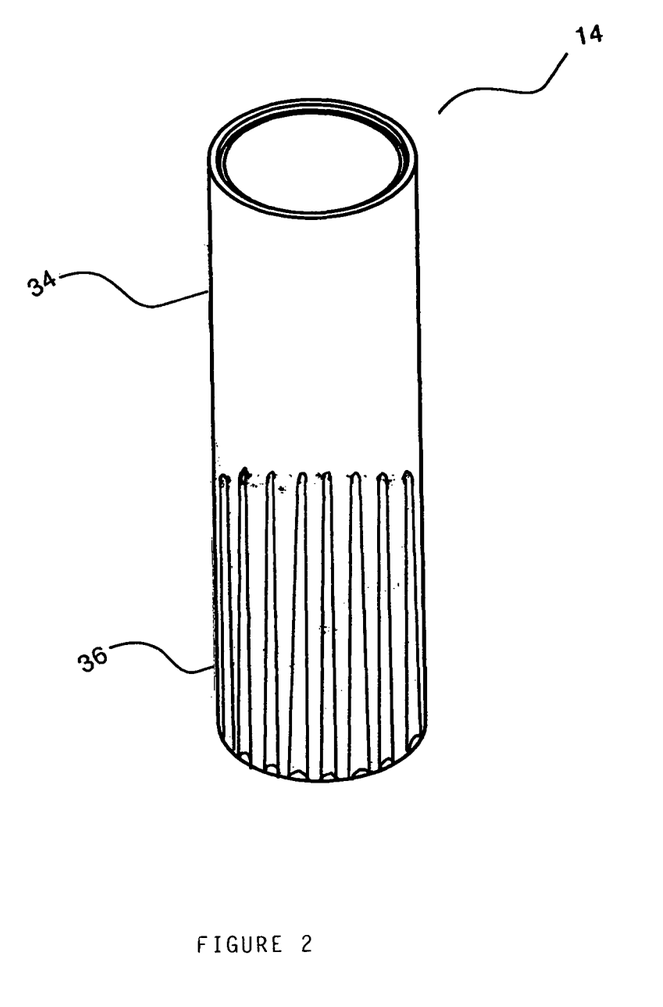
FIG. 2 is a perspective view of the external appearance of the elongated canister that contains the elemental form of silicon material.

As seen in FIG. 2, the elongated canister to which the elemental form of silicon material is enclosed therein, includes along its outer circumferential side (34) a series of grooves or slots (36) which offers a greater surface for exchange between the thermal energy transfer of the elemental form of silicon material and the thermal energy absorbing material of the sintered graphite.

The slots (36) on the external side (34) of the elongated canister (14) containing the elemental form of silicon material acts as heat sink in its ability to offer a greater surface area contact.

Figure 3:
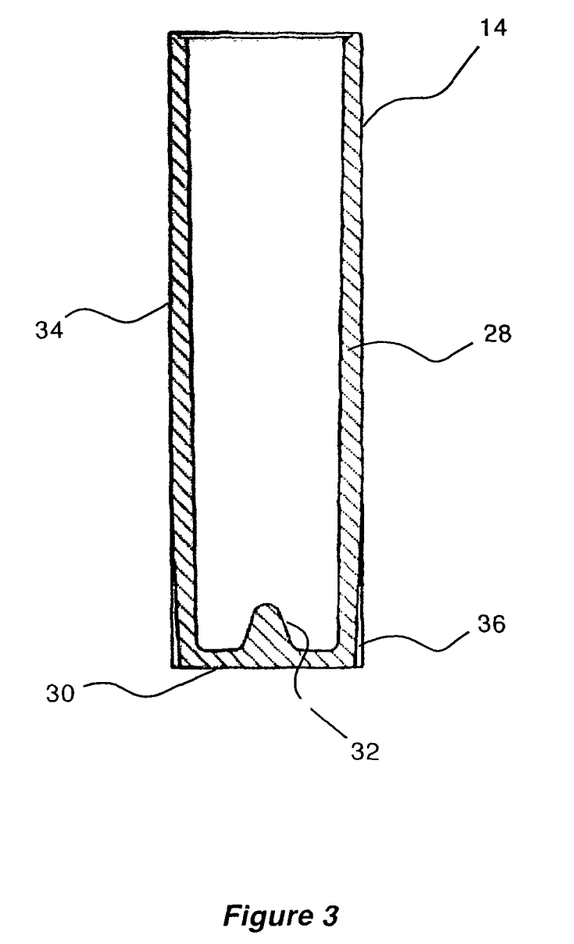
FIG. 3 is a cross-sectional view showing the internal structure of the elongated canister containing the elemental form of silicon material.

FIG. 3 shows a cross-sectional view of the elongated canister containing the elemental form of silicon material (32), where can be seen at the base of the cylindrical structure (30), the lined refractory material, preferably ceramic, includes a pressure dispersion punt.

Figure 4:
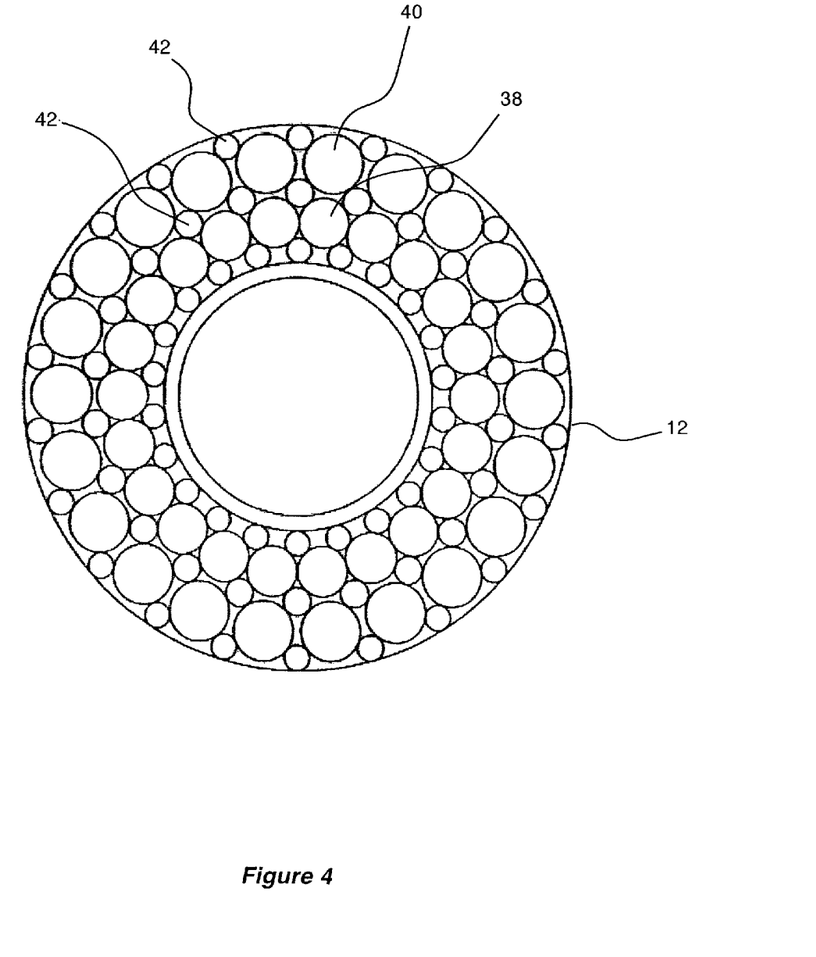
FIG. 4 is what could best be described as a schematic top cross-sectional view of the housing unit showing the positioning of the elongated canisters interlaced and supported therein with the elongated sintered graphite rods.

FIG. 4 shows that inside the main housing block (12) the elongated canisters containing the elemental form of silicon material can be of varying dimensions, wherein the first inner row of circumferentially arranged canisters (38) have a smaller dimension to the outer circumferential or second row (40), and where packed in between the respective elongated canisters (38) and (40) are a series of elongated rods (42) made up of sintered graphite material which act as the thermal energy absorption material communicating between the elemental form of silicon material and the wicking material in communication with the Stirling engine (26).

Figure 5:
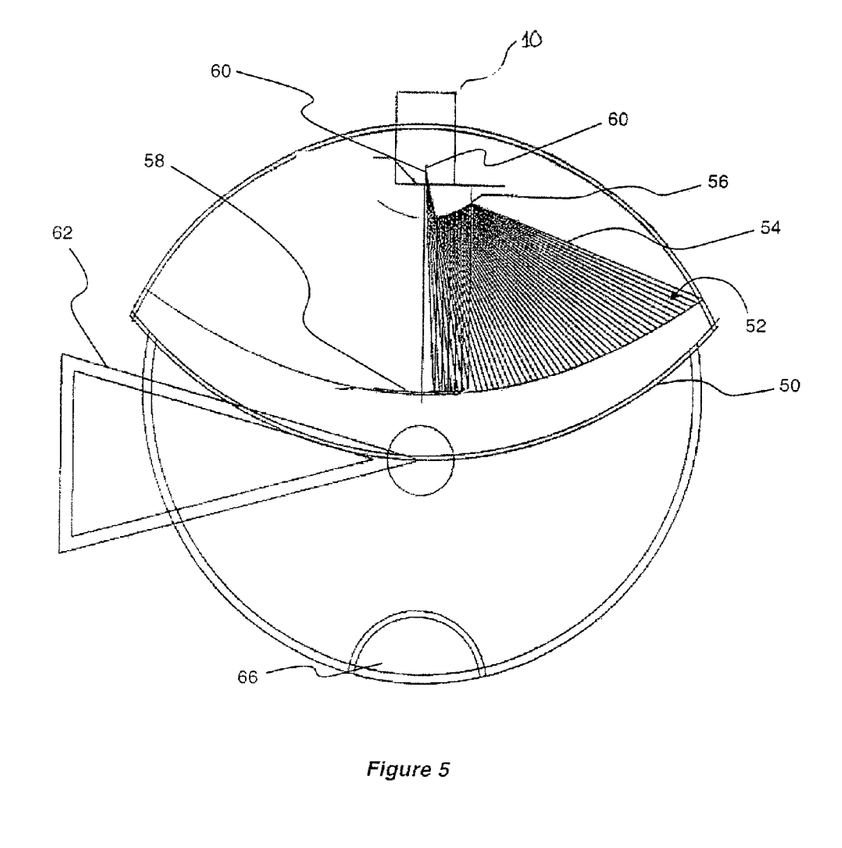
FIG. 5 is a schematic representation off the solar reflector arrangement, which includes the two additional lenses and/or reflectors for redefining the collection of the solar input into a more concentrated focal point against the thermal energy storage apparatus.
Figure 6:
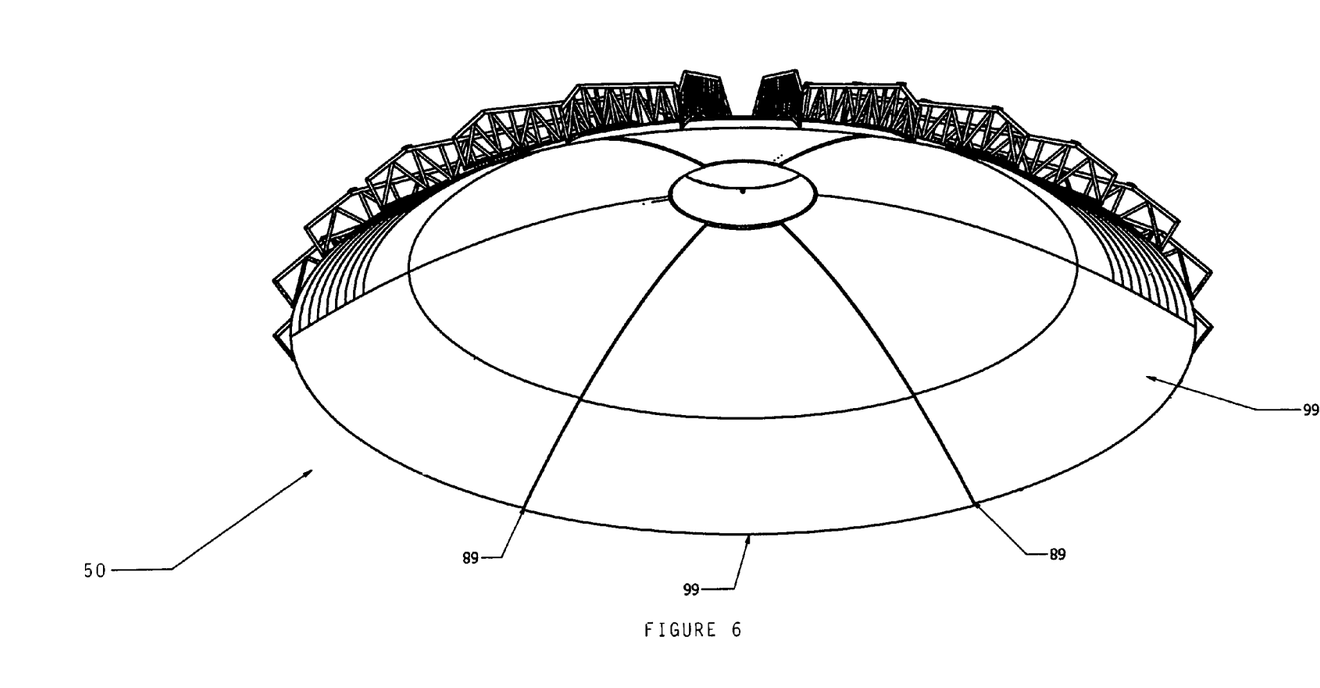
FIG. 6 is a schematic representation of the solar reflector in a preferred embodiment of this invention, which sees the actual solar reflector dish being subdivided into segments to provide slots in between through which winds can pass, rather than simply providing deflectable pressure upon the solar reflector per se.

FIGS. 5 and 6 refer to a further preferred embodiment of this invention which has been introduced above with respect to the solar reflector arrangement in order to establish a focussing system to concentrate and collect as much the solar energy as possible directed towards the thermal energy storage apparatus.

In this arrangement, the main parabolic reflector (50), with its front concaved curved orientation providing the main dish surface (52) towards the source of solar, communicates or directs its captured energy, shown by way of lines (54), to a located lens and/or hyperbolic dish (56) which, by its own concaved arrangement, then in fact captures and reflects the energy back on to lens (58), which is then able to create a more concentrated focal point (60) to deliver the solar energy to the thermal energy storage apparatus (10). Such an arrangement corresponds with an energy receiving area (15) shown in FIG. 1.

As with previous arrangements, the reflector would be supported through a structure, shown generally as (62), and also on rollers and part of a control system, which would see its ability to also track the solar source in azimuthally and in various elevated directions.

There would also be a counter-balance (66) included, which would allow for smaller motors to actually drive and control the reflector to its various directional positioning.

FIG. 6 shows very simply and schematically how the main reflector (50) could be broken up into a series of segments to create the overall dish, wherein there could be spacing's (68) between the respective segments (66) to allow wind to pass through the reflector, rather than having high pressure winds try and deflect against the main reflector (50).

The invention claimed is:

1. A thermal energy storage apparatus adapted to receive heat source input for the development and substantially continuous supply of thermal energy to a Stirling engine for the transfer of said thermal energy to electrical and/or mechanical energy, even during periods when heat source input is intermittent or unavailable for a period of time, said apparatus including:
    a main housing block containing a series of elongated refractory canisters made of refractory material, and further containing a thermal energy absorbing material situated about the refractory canisters;
    said elongated refractory canisters containing an elemental form of silicon material adapted to absorb thermal energy from the thermal energy absorbing material contained within the main housing block;
    wherein the elemental form of silicon material, upon absorbing thermal energy from the thermal energy absorption material, transforms from a solid to liquid state allowing said elemental form of silicon material to latently or effectively store the thermal energy therein, and wherein the elemental form of silicon material transfers thermal energy back into the thermal energy absorption material when the thermal energy absorption material has a lower temperature than the elemental form of silicon material;
    the thermal energy storage apparatus further including wicking material in communication with the thermal energy absorption material and with the Stirling engine, such that thermal energy transfer from the thermal energy absorption material into the wicking material registers as a thermal energy input to the Stirling engine to commence the transfer of said thermal energy to workable mechanical and/or electrical energy through the Stirling engine;
    said elongated refractory canisters each having a cylindrical casing made of refractory material configured to receive the elemental form of silicon material;
    wherein the thermal energy absorbing material is made up of sintered graphite; and
    wherein the sintered graphite material is compressed or moulded into elongated rods which are entwined and packed against the respective elongated refractory canisters.

2. The thermal energy storage apparatus of claim 1 wherein there are two rows of the refractory canisters, an inner circumferentially positioned row and an outer circumferentially positioned row, the rows being supported and intertwined within the thermal energy absorbing material within the main housing block.

3. The thermal energy storage apparatus of claim 2 wherein the refractory canisters of the inner circumferentially positioned row have smaller diameters than the refractory canisters of the outer circumferentially positioned row.

4. A thermal energy storage device including:
a. elongated containers formed of refractory material;
b. thermal batteries situated within the elongated containers, each thermal battery being formed of silicon material adapted to:
   (1) absorb thermal energy to undergo a solid-to-liquid phase change, and
   (2) release absorbed thermal energy to undergo a liquid-to-solid phase change; and
c. thermal absorbing material situated about the lengths of the elongated containers, the thermal absorbing material containing graphite;
wherein:
   (I) the elongated containers are arrayed along concentric circular paths; and
   (II) the elongated containers within an innermost circular array have smaller circumferences than the elongated containers within an outermost circular array.

5. A thermal energy storage device including:
a. several elongated containers formed of refractory material;
b. several elongated thermal batteries, each thermal battery being:
   (1) situated within one of the elongated containers, and
   (2) formed of material adapted to:
      (a) undergo a reversible solid-to-liquid phase change upon absorption of thermal energy, and
      (b) release at least some of the absorbed thermal energy upon changing phase from liquid to solid;
c. thermal absorbing material situated about the lengths of the elongated containers, the thermal absorbing material containing graphite;
wherein:
   (I) the thermal absorbing material is defined by elongated thermal absorbing members, with the length of each elongated thermal absorbing member being situated against the length of at least one of the elongated containers; and
   (II) the thermal absorbing members are arrayed along concentric circular paths.

6. The thermal energy storage device of claim 5 further including a mirror configured to concentrate incident light to generate thermal energy therefrom, the thermal energy being received by the thermal absorbing material.

7. The thermal energy storage device of claim 5 further including a Stirling engine situated to receive thermal energy from the thermal absorbing material.

8. The thermal energy storage device of claim 7 further including thermal wicking material interposed between the thermal absorbing material and the Stirling engine, the thermal wicking material being configured to effect rapid heat transfer between the thermal absorbing material and the Stirling engine.

9. The thermal energy storage device of claim 5 wherein each elongated thermal absorbing member has a cylindrical form.

10. The thermal energy storage device of claim 9 wherein each elongated container has a cylindrical form.

11. The thermal energy storage device of claim 5 wherein the elongated containers are arrayed along concentric circular paths.

12. The thermal energy storage device of claim 11 wherein the elongated containers within an innermost circular array have smaller circumferences than the elongated containers within an outermost circular array.

13. The thermal energy storage device of claim 11 wherein the thermal absorbing material is situated along circular paths about each circular array of elongated containers.

14. The thermal energy storage device of claim 5 wherein the thermal absorbing members within each circular path are spaced from each other along each circular path.

* * * * *